(12) United States Patent
McRae

(10) Patent No.: US 6,425,957 B1
(45) Date of Patent: Jul. 30, 2002

(54) MATERIAL RECOVERY SYSTEM AND METHOD FOR USED OIL FILTER AND OIL CONTAMINATED MATERIALS

(76) Inventor: Harrell Jerald McRae, 23115 Lagoon La., Huffman, TX (US) 77336

( * ) Notice: Subject to any disclaimer, the term of this patent is extended or adjusted under 35 U.S.C. 154(b) by 0 days.

(21) Appl. No.: 09/495,237

(22) Filed: Jan. 31, 2000

(51) Int. Cl.7 ................................................ B08B 7/00
(52) U.S. Cl. ........................ 134/19; 134/10; 134/25.1; 134/105
(58) Field of Search ........................... 134/10, 19, 25.1, 134/105

(56) References Cited

U.S. PATENT DOCUMENTS

| | | | |
|---|---|---|---|
| 4,476,791 A | 10/1984 | Cegielski, Jr. | 110/346 |
| 4,534,300 A | 8/1985 | Reed et al. | 110/171 |
| 4,544,491 A | 10/1985 | Tyson et al. | 210/772 |
| 4,629,056 A | 12/1986 | Simelunas et al. | 198/406 |
| 4,922,838 A | 5/1990 | Keller et al. | 110/234 |
| 5,135,176 A | 8/1992 | Barber | 241/23 |
| 5,165,334 A | 11/1992 | Aluotto et al. | 100/112 |
| 5,188,300 A | 2/1993 | Wolf | 241/23 |
| 5,228,626 A | 7/1993 | Mayolo | 241/65 |
| 5,236,136 A | 8/1993 | McCarty et al. | 241/24 |
| 5,243,754 A | 9/1993 | Tasch et al. | 29/801 |
| 5,297,332 A | 3/1994 | Ross et al. | 29/801 |
| 5,298,079 A | 3/1994 | Guymon | 134/16 |
| 5,299,348 A | 4/1994 | Slack et al. | 29/403 |
| 5,299,352 A | 4/1994 | Klenk | 29/801 |
| 5,349,901 A | 9/1994 | Brittain et al. | 100/37 |
| 5,360,553 A | 11/1994 | Baskis | 210/774 |
| 5,366,165 A | 11/1994 | Jackman | 241/24 |
| 5,401,293 A | 3/1995 | Gardner | 75/403 |
| 5,406,691 A | 4/1995 | Thorne | 29/564 |
| 5,433,390 A | 7/1995 | Keeler et al. | 241/33 |
| 5,524,356 A | 6/1996 | Lutz | 34/164 |
| 5,678,478 A | 10/1997 | Goyal et al. | 100/52 |
| 5,735,197 A | 4/1998 | Kleine | 100/127 |

*Primary Examiner*—Zeinab El-Arini
(74) *Attorney, Agent, or Firm*—Head, Johnson & Kachigian (57) ABSTRACT

A material recovery process for used oil filters and oil contaminated materials. In a preferred embodiment, the process includes the steps of loading wire mesh baskets or racks with a plurality of used oil filters containing oil. The baskets are thereafter loaded into a sealable furnace. The furnace is a sealed vessel with air regulated through a series of burners. The oil filters are heated in the furnace in a first stage to a first temperature range for a first given time period. Oil released from the oil filters is drained from the furnace. The oil filters are heated to a second temperature range for a second given time period. The oil filters are thereafter heated to a third temperature range for a third given time period. Finally, the furnace is cooled through use of a plurality of air manifolds.

19 Claims, 9 Drawing Sheets

MATERIAL RECOVERY SYSTEM AND METHOD FOR USED OIL FILTER AND OIL CONTAMINATED MATERIALS

BACKGROUND OF THE INVENTION

1. Field of the Invention

The present invention is directed to a system and a method for processing used oil filters or other oil contaminated materials which will produce recyclable oil, and oil-free metal, along with energy to power a boiler or other co-generation device.

2. Prior Art

In 1997, there were approximately 417,600,000 automotive oil filters sold in the United States and only 118,000,000 were recycled. In 1998, there were 427,700,000 automotive oil filters sold in the United States and only 135,000,000 were recycled (according to the Filter Manufacturers Council). These figures are for "light duty" automotive filters only and do not include the huge industrial filter market which includes heavy trucks, compressors, marine, and other filter users. In the past, used oil filters have often been buried in landfills. The U.S. Environmental Protection Agency has determined that the waste oil leakage from these used oil filters will contaminate the soil, and eventually penetrate into the water table endangering precious water supplies. Guidelines were established by the E.P.A. to eliminate the disposal of used oil filters in landfills, and many states have adopted these guidelines as state standards.

Used oil filters (automotive and industrial) contain a tremendous amount of energy and natural resources that in the past have been wasted. The vast majority of these filters consist of a steel jacket, paper or plastic filter media, and up to 25% (by weight) used oil. Crushing the filters reduces the oil content down to approximately 8%–12% (by weight). While recycling of steel is well known, it can not be accomplished effectively with oil remaining. Crushing the filters removes some of the oil for recycling, however the steel from the canister, which is covered with oil, is virtually worthless unless the residual 8%–12% of the oil is removed. Additionally, there is also approximately 10%–15% of the filter weight remaining as paper filter media. This paper (or plastic in some cases) represents a tremendous energy source with a BTU value ranging from 8,500–19,000 BTU/pound.

The used oil filter collection industry, because of the volume being generated, has begun crushing and compacting the filters into large blocks or billets. There are several prior art patents covering various devices of this type. The present invention will process all types of used oil filters and oil contaminated wastes, including, uncrushed filters, crushed filters, small compacted billets of filters (10#–35#), very large compacted billets (35#–200#), and even larger compacted billets or blocks of used oil filters. The system will also process many types of absorbents such as oily rags, oil booms, oil boom pads, oil dry granules, and the like.

The existing art either ignores the problem of oil on the steel by attempting to warm the canisters up to where there is only about 3% oil left on the steel; and these systems do not use the paper and plastic as a heat source for other devices.

There is an urgent need for a system and a method that will remove all of the waste oil from the steel so that it can be sold at normal scrap metal prices. There is also a need for a system to salvage an additional 5%–10% of the residue oil left after crushing.

There is also a need for a material recovery system and a method to utilize the heating value of the paper or plastic filter media.

There is also a need for a material recovery system and a method to be able to perform all of these things in volume, and economically, so that there is an incentive to recycle these products rather than dispose of them improperly.

Some of the existing art forms use added water in the process which generates a new water pollutant that must be treated with expensive chemicals or otherwise. These known processes are very expensive to build and to operate and produce very small quantities of finished product.

For example, Gardner (U.S. Pat. No. 5,401,293) recycles oil from filters, recondenses hydrocarbon condensate, separates the water, runs the water through an acid scrubber, and crushes filters on a press.

Barber (U.S. Pat. No. 5,135,176) discloses a batch oil filter recycler where shredded filters are stored in baskets and moved in a thermal unit by a crane. The thermal unit has a higher temperature upper chamber that receives gaseous emissions from the lower chamber.

The goal of the present invention is to provide a material recovery system and method that will enable large or small companies to process large or small quantities of used oil filters or other oil contaminated wastes at a low initial investment, and produce oil free steel, recyclable oil, and energy to power a boiler or other co-generation devices.

The present invention will cost very little to operate because the fuel source is the same waste oil that is "hot drained" from the system at the beginning of the cycle. Accordingly, the system is nearly self-sustaining.

A further object and purpose of the present invention is to provide a process and system to process used oil filters resulting in an extremely clean stack emission.

The present invention will accept any form of used oil filters or oil contaminated waste into alloy baskets which are placed inside of the processor which then elevates the temperature using "hot drain oil" generated by the system as the fuel for the process. The temperature is elevated in three or four stages then control cooled in a final stage.

SUMMARY OF THE INVENTION

The present invention provides a material recovery system and a process for treating used oil filters or other oil contaminated materials. Initially, used oil filters may be crushed and then compacted into billets or blocks of filters. The billets or blocks are placed in alloy or hi-temperature wire mesh baskets. In one preferred embodiment, the wire baskets are, in turn, loaded on supports which extend from a rail car. The rail car includes a plurality of wheels which ride on a series of rails. Accordingly, the rail car is permitted to move between a loading and unloading position and a position within the furnace.

The furnace includes a pair of opposed walls, a top, one closed end, a sloping floor and an open end with the rails extending through the open end. The furnace includes a plurality of burners which extend through the opposed walls and supply heat to the furnace.

A secondary chamber is above and in fluid communication with the furnace.

The rail car has open sides and includes a car bottom with a plurality of slots. In an area surrounding each slot, the car bottom slopes toward the slot. Accordingly, any oil draining and falling from the crushed filters, through the wire baskets and onto the car bottom will drain toward and through the slots. Thereafter, the oil will move by gravity down the sloped floor of the furnace to a catch basin where it moves by gravity to a storage tank.

One end of the rail car terminates in a door which is substantially perpendicular to the bottom of the rail car. When the rail car has been moved into the furnace, the door will form an exterior wall of the furnace and close the open end of the furnace. Accordingly, a seal is created between the upstanding wall and the opening in the furnace. The rail car may be moved on the tracks by a motor or an engine.

In an alternate preferred embodiment, the wire baskets with filters are loaded through open doors of the furnace. The doors move on tracks by a roller guide assembly. Each door seals with the furnace with a triple seal arrangement to make an air-tight seal.

The material recovery process of the present invention utilizes multiple stages or steps to accomplish the desired results. After the crushed oil filters have been loaded into baskets and then sealed inside the furnace, the furnace will be heated to a first, initial stage with temperature range of from 250° to 600° F. During this stage, oil trapped in the filters becomes more fluid and will flow out of the filters through the wire baskets, through the car bottom and then to the bottom of the furnace where the floor is sloped.

Thereafter, the temperature will be elevated in a second stage to a second temperature range of between 400° to 800° F. for a second time period of from two to four hours. During this stage, the remaining free oil drains out of the oil filters. The oil will gradually stop running out of the furnace and any remaining oil within the furnace will begin to gasify. Some of these gases will proceed in gas form to the secondary chamber above the furnace.

Thereafter, the furnace is further heated to an elevated temperature in a third stage having a third temperature range of between 600° to 1200° F. for a time period of two to four hours. During this third stage, the filter media begins to reduce since the combustion in the furnace is sub-stoichiometric. The plastic will gasify and tend to burn as fuel in the secondary chamber and the paper will begin to form carbon black.

An optional fourth stage may be employed having a fourth temperature range of between 800° to 1400° F. for a period of approximately four hours.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

While the detailed description describes the process with reference to used oil filters, it will be understood that the material recovery system is also applicable to other oil contaminated materials.

Like numbers in the drawings indicate like parts in various embodiments of the invention.

Figure 1:
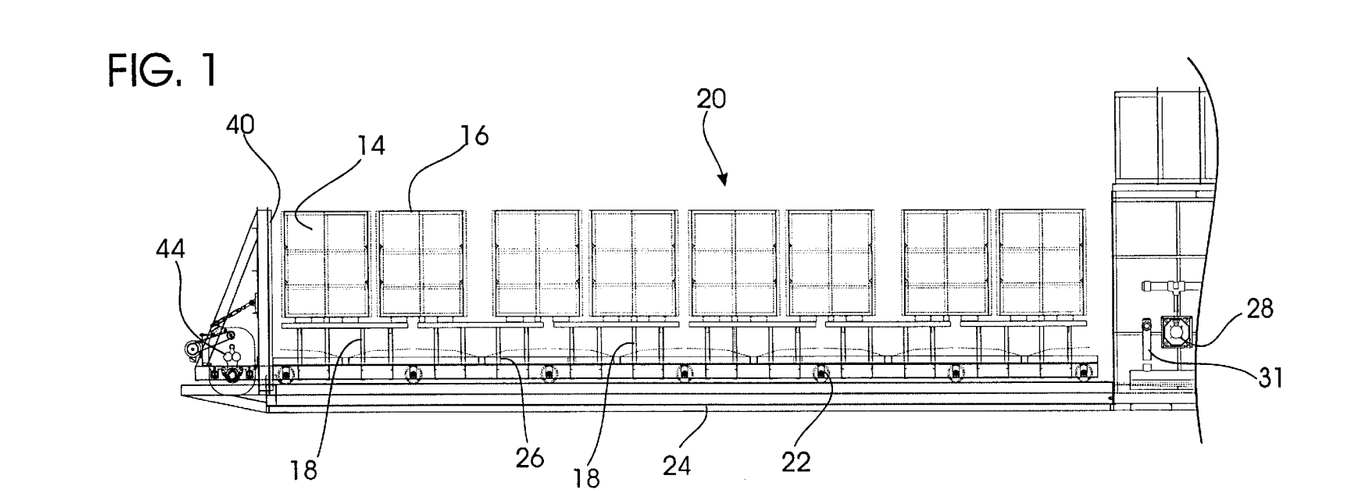
FIG. 1 illustrates a rail car with wire baskets loaded with used oil filters to be used as part of the material recovery system of the present invention.
Figure 2:
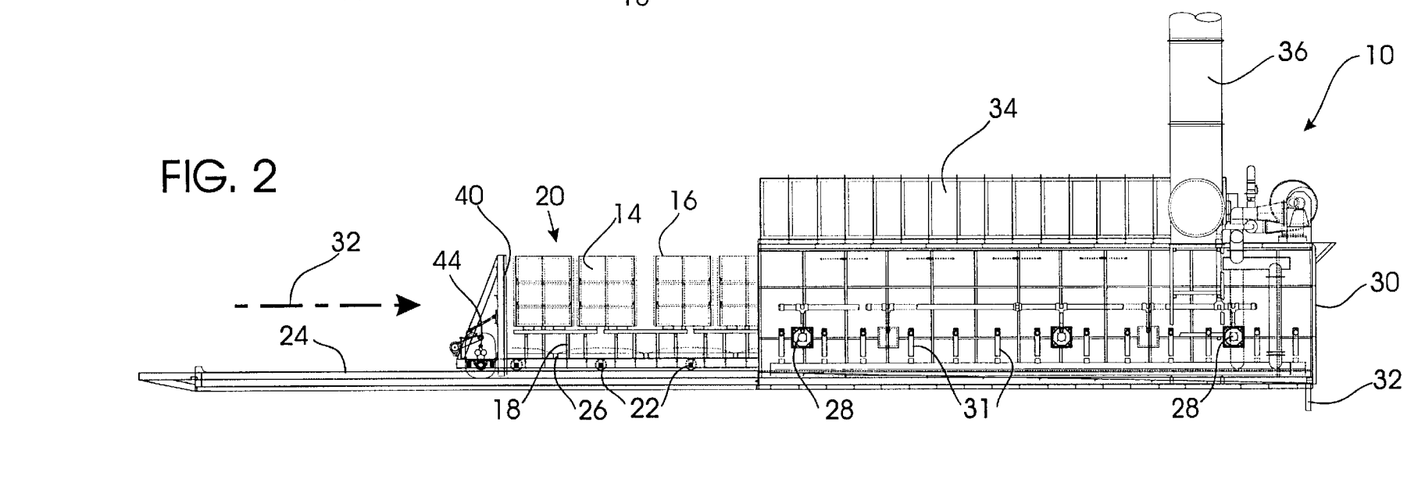
FIG. 2 illustrates the rail car shown in FIG. 1 moving into the furnace which is a part of the material recovery system of the present invention.

Referring to the drawings in detail, FIGS. 1 and 2 illustrate a material recovery system and process 10 as shown in one of two preferred embodiments. In an initial preferred process, a large number of used oil filters 14 may initially be crushed in a known manner (not shown) which removes some of the existing oil from the used oil filters 14. In one example, crushing of the filters decreases the oil content from 25% to between 8% and 12% by weight. The crushed oil filters will be compacted into small billets of filters of 10 to 35 pounds or larger compacted billets of 35 pounds to 200 pounds. As seen in FIGS. 1 and 2, these billets of filters 14 are placed in wire mesh baskets 16 or racks which are constructed of a high temperature metal alloy which will withstand great temperatures. The wire baskets 16 are, in turn, loaded onto a plurality of upstanding supports 18 by means of fork lifts or otherwise. The supports 18, in turn, are fixed on a rail car 20. Alternately, it will be understood that the used filters may be loaded into the baskets 16 loosely without crushing.

The rail car 20 includes a plurality of wheels 22 which will be described further herein. The wheels 22 ride on a series of rails 24 which extend into the furnace 30 as seen in FIG. 2. Accordingly, the rail car 20 is permitted to move between a loading and unloading position, shown in FIG. 1, and a position within the furnace 30.

The furnace 30 includes a pair of opposed walls, a top, one closed end, a sloping floor and an open end. The tracks extend through the open end. As best seen in FIG. 2, arrow 32 illustrates the direction of movement for moving a rail car 20 loaded with oil filters 14 into the open end of the furnace 30 for the material recovery procedure within the furnace 30.

Figure 3:
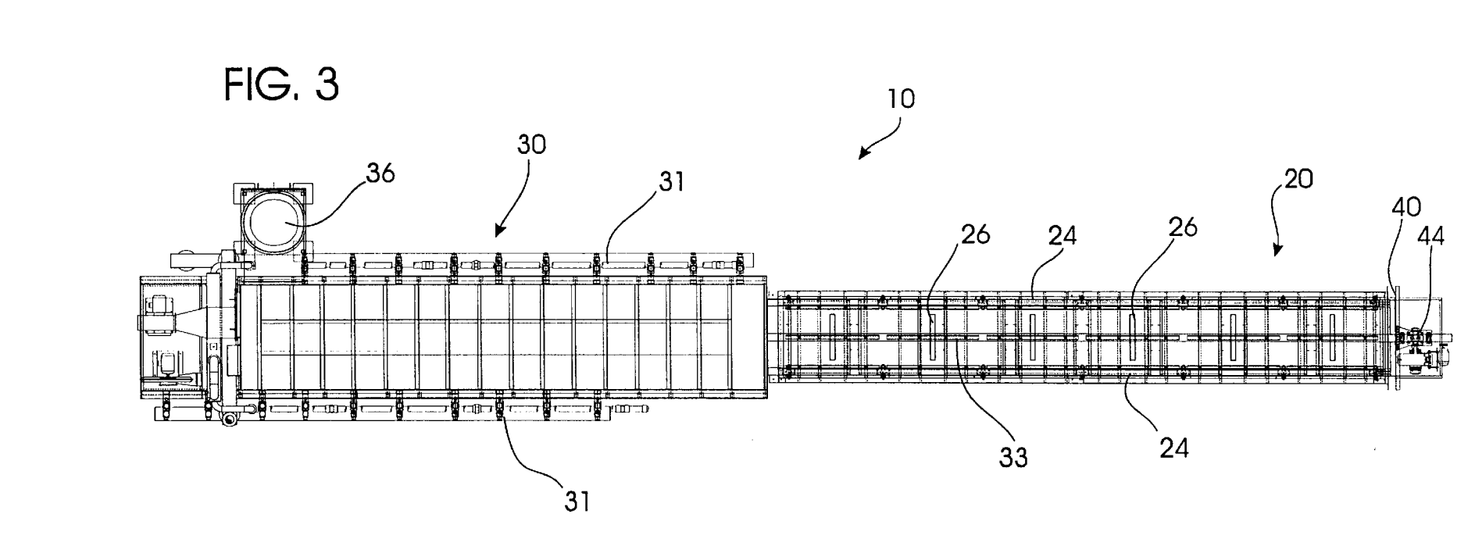
FIG. 3 is a top view of the rail car and the furnace with the baskets and oil filters removed for ease of viewing.

FIG. 3 illustrates a top view of the material recovery apparatus 10 with the rail car 20 outside of the furnace 30 prior to loading any of the filters and baskets therein.

With continuing reference to FIGS. 1 and 2, the rail car 20 has open sides and includes a car bottom having a plurality of slots 26. In an area surrounding each slot 26, the car bottom slopes toward the slot 26. Accordingly, any oil draining and falling from the crushed oil filters onto the car bottom will drain toward and through the slots 26. Thereafter, the oil will fall to the floor of the furnace and will move by gravity down the sloped floor of the furnace to a catch basin 32 or storage area. A plumbing drain air lock is incorporated to prevent air from entering. The oil may be used as a fuel source for the furnace 30.

The furnace 30 also includes a plurality of burners 28 which extend through the opposed walls and supply heat to the furnace 30. Also shown are a plurality of air inlet manifolds 31 for cool down purposes.

In addition to the furnace 30, a secondary chamber 34 is above and is in fluid communication with the furnace 30 itself. A smoke stack 36 is in fluid communication with both the secondary chamber 34 and with the furnace 30.

In the present embodiment, a series of two parallel rails 24 are utilized along with two sets of wheels 22. The rails and wheels are constructed of materials which accommodate high temperatures. Between the parallel rails 24 is a roller chain support 33 for the car drive assembly.

Figure 4:
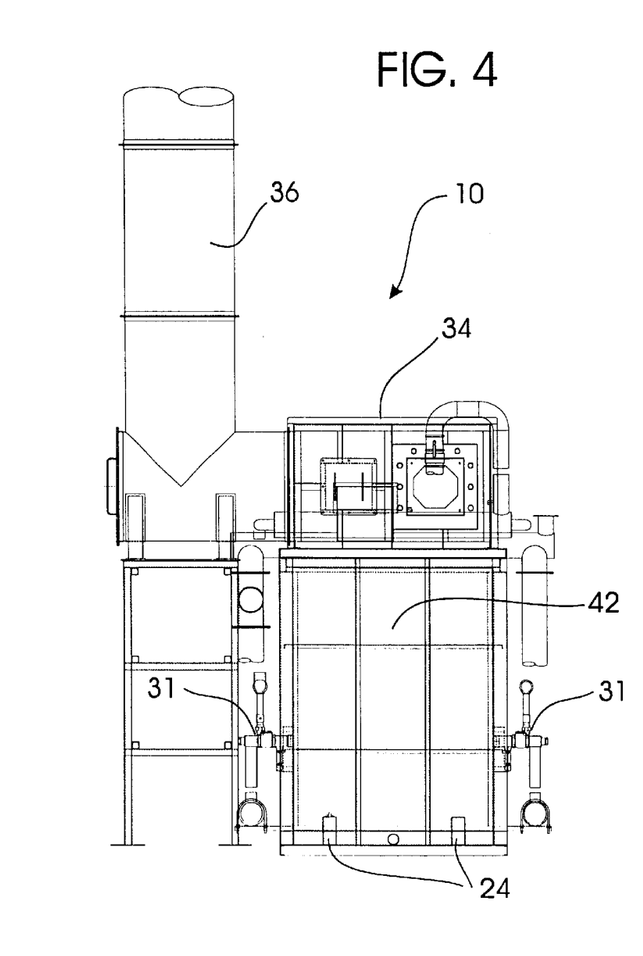
FIG. 4 is an end view and FIG. 5 is an opposite end view of the material recovery system shown in FIGS. 1, 2 and 3.
Figure 5:
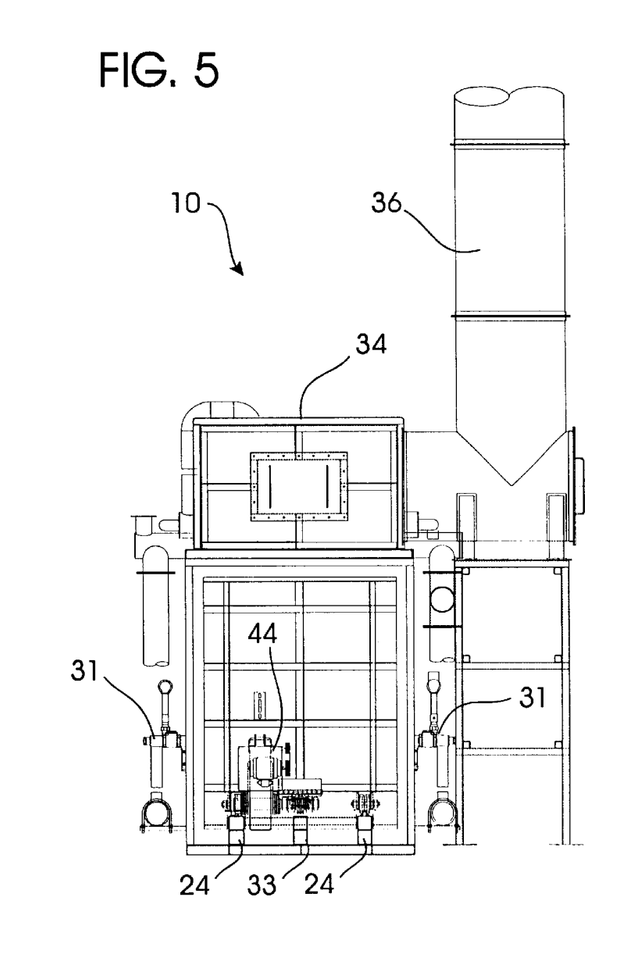

FIGS. 4 and 5 illustrate opposite ends of the furnace 30. The burners 28 are clearly visible and are connected by a network of piping. Fuel and air to the burners is controlled by a control system, which is well known.

At least one of the rails 24 terminates in an upper pyramidal shape which mates with a recess on one of the wheels to assist in alignment of the rail car on the wheels.

FIG. 4 illustrates the closed end 42 of the furnace while in FIG. 5 the rail car is shown fully within the furnace 30.

With reference to FIG. 5 and continuing reference to FIGS. 1, 2 and 3, one end of the rail car terminates in a door 40 which is substantially perpendicular to the bottom of the rail car 20. When the car has been moved in the direction of arrow 32 into the furnace, the door 40 forms one exterior wall of the furnace 30 and closes the open end of the furnace. Accordingly, a seal is created between the upstanding wall of the door 40 and the opening in the furnace 30. Once this has been accomplished, no air is permitted into the sealed furnace (except via the burner control system). In FIG. 5, the door 40 is shown in the closed position.

The rail car is moved on the tracks by an electric motor or engine 44 having a drive assembly to reduce the rpm's from 1200 to approximately 11.

Figure 6:
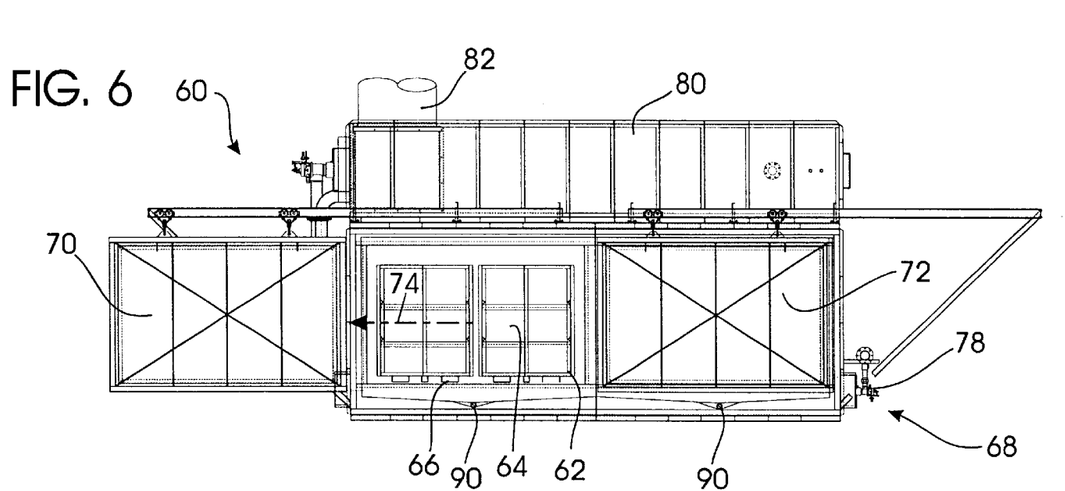
FIGS. 6 and 7 illustrate a second, alternate embodiment of the material recovery system of the present invention.
Figure 7:
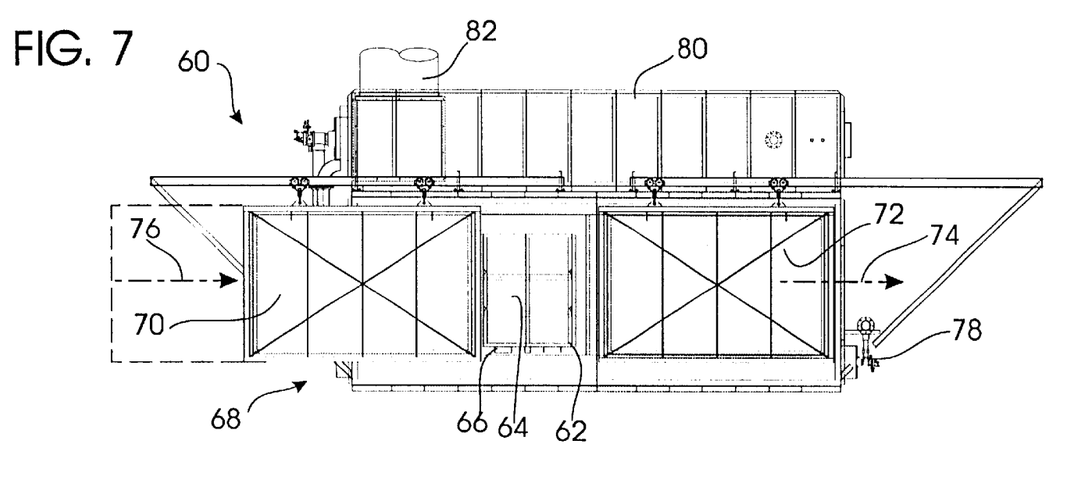

FIGS. 6 and 7 illustrate a second, alternate embodiment of the present invention. In the alternate embodiment 60, a material recovery system will include a process where used oil filters 64 are initially crushed and then compacted as previously described. The billets of filters 64 are placed in wire mesh baskets 62 constructed of a high temperature metal alloy which will withstand great temperatures. The wire mesh baskets 62 are, in turn, loaded onto a plurality of upstanding supports 66 within a furnace 68. The furnace 68 includes a pair of closed ends, a top, a sloped bottom floor, one closed side and an open side.

The floor of the furnace contains a series of slots 90. The area surrounding each slot is sloped so that oil drains thereto and to a storage tank (not shown).

The wire baskets 62 containing the used oil filters 64 may be loaded or unloaded into the furnace by a forklift (not shown) or otherwise.

Once the baskets have been loaded into the furnace 68 through the open side, a pair of doors 70 and 72 are each moved from an open position to a closed position. Arrows 74 illustrate movement of the doors to an open position while arrow 76 illustrates movement of the door from an open position to a closed position.

Figure 8:
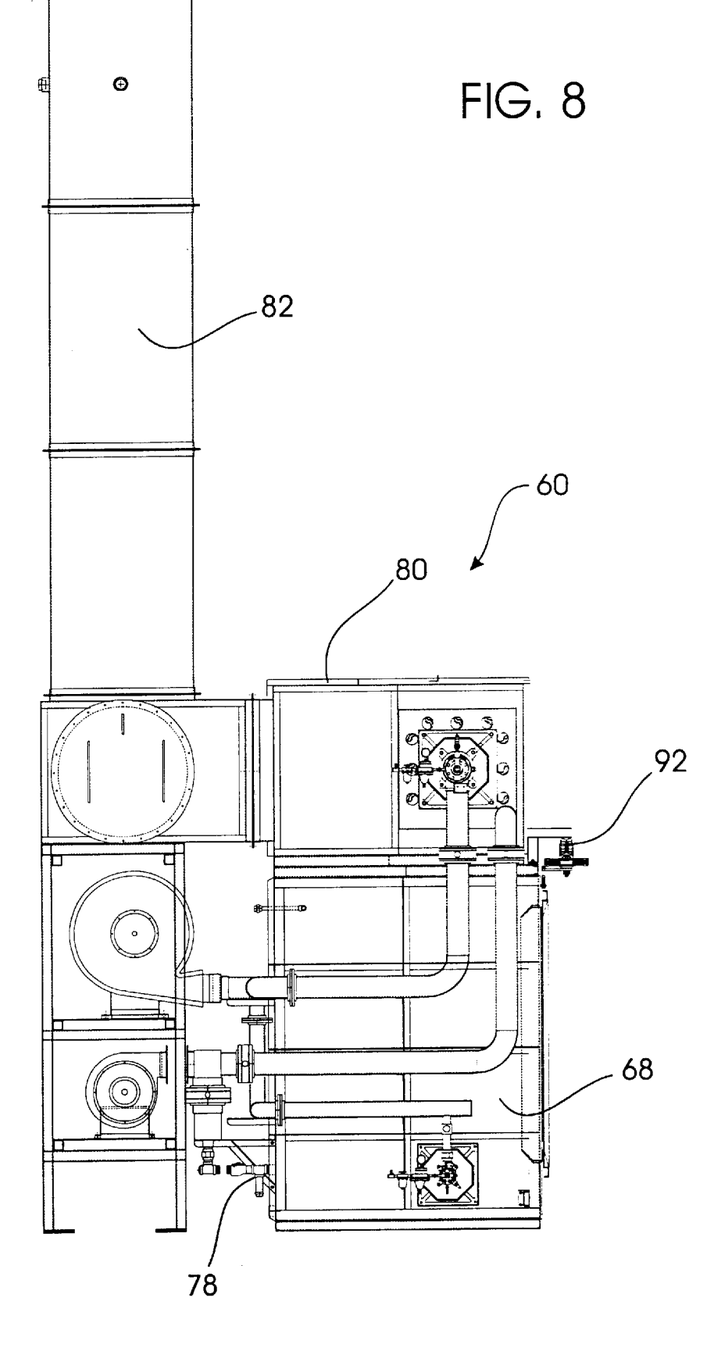
FIG. 8 shows an end view of the material recovery system shown in FIGS. 6 and 7.

The furnace 68 includes a plurality of burners 78 which extend through at least one wall of the furnace and heat the oil filters. Fuel and air to the burners is controlled by a control system, which is well known. A secondary chamber 80 is in fluid communication with the furnace or primary chamber. FIG. 8 illustrates an end view of the furnace 68 shown in FIGS. 6 and 7. A smoke stack 82 is in fluid communication with both the secondary chamber 80 and with the furnace.

The material recovery process of the present invention utilizes multiple stages or steps to accomplish the desired results. The heating and cooling process operates in the same manner in each of the preferred embodiments. Heating and cooling of the used oil filters is accomplished in a sub-stoichiometric or "starved air" environment so that the filters will first hot drain, then gasify, then form carbon black as a residue from the sub-stoichiometric heating.

After the crushed oil filters have been loaded into the baskets and then sealed inside the furnace, the furnace will be heated to a first, initial temperature range of from 250° to 600° F. with a preferred temperature of approximately 400° F. During this stage, oil that is trapped in the oil filters becomes more fluid and will flow out of the filters, through the car bottom and then to the bottom of the furnace where the floor is sloped. Oil will drain to a catch basin, storage tank or receptacle through a plumbing drain air lock which will prevent air from entering the furnace. The temperature will be held at the first temperature range for approximately two to three hours.

Contemporaneously or prior thereto, the secondary chamber will be preheated to a minimum temperature of 1600° F. by a secondary furnace.

Thereafter, the temperature in the furnace will be elevated in a second stage from the first temperature range to a second temperature range of between 400° to 800° F. for a second period of time of from two to four hours. A preferred temperature during the second stage is approximately 600° F. During this stage, the remaining free oil drains out of the oil filters. During the second stage, oil will gradually stop running from the filters and out of the furnace. Any remaining oil within the furnace will begin to gasify. Since the gases are hot, they will rise. Some of these gases will proceed in gas form to the secondary chamber 80 above the furnace. When these oil gases are mixed with controlled air in the secondary chamber, they become fuel in order to maintain the secondary chamber at a preset temperature, approximately 1800° F. The oil gases act as fuel to the secondary chamber so that the burners in the secondary chamber may be turned off.

Thereafter, the furnace is further heated to an elevated temperature above the second temperature range. In the third stage, the oil filters are heated to a third temperature range of between 600° to 1200° F. for a time period of two to four hours. A preferred temperature is approximately 800° F. During this third stage, the filter media, such as paper and/or plastic begins to reduce since the combustion in the furnace is sub-stoichiometric. The plastic will gasify and tend to burn as fuel in the secondary chamber and the paper will begin to form carbon black. The carbon black or fixed carbon will weigh only a small percentage of the original weight of the filter and contains little free hydrocarbons.

An optional, fourth heating stage may thereafter be employed. In the fourth heating stage, the temperature is raised to a fourth temperature range. The oil filters are heated in the furnace to a fourth temperature range of between 800° to 1400° F. for a period of approximately four hours.

Figure 9:
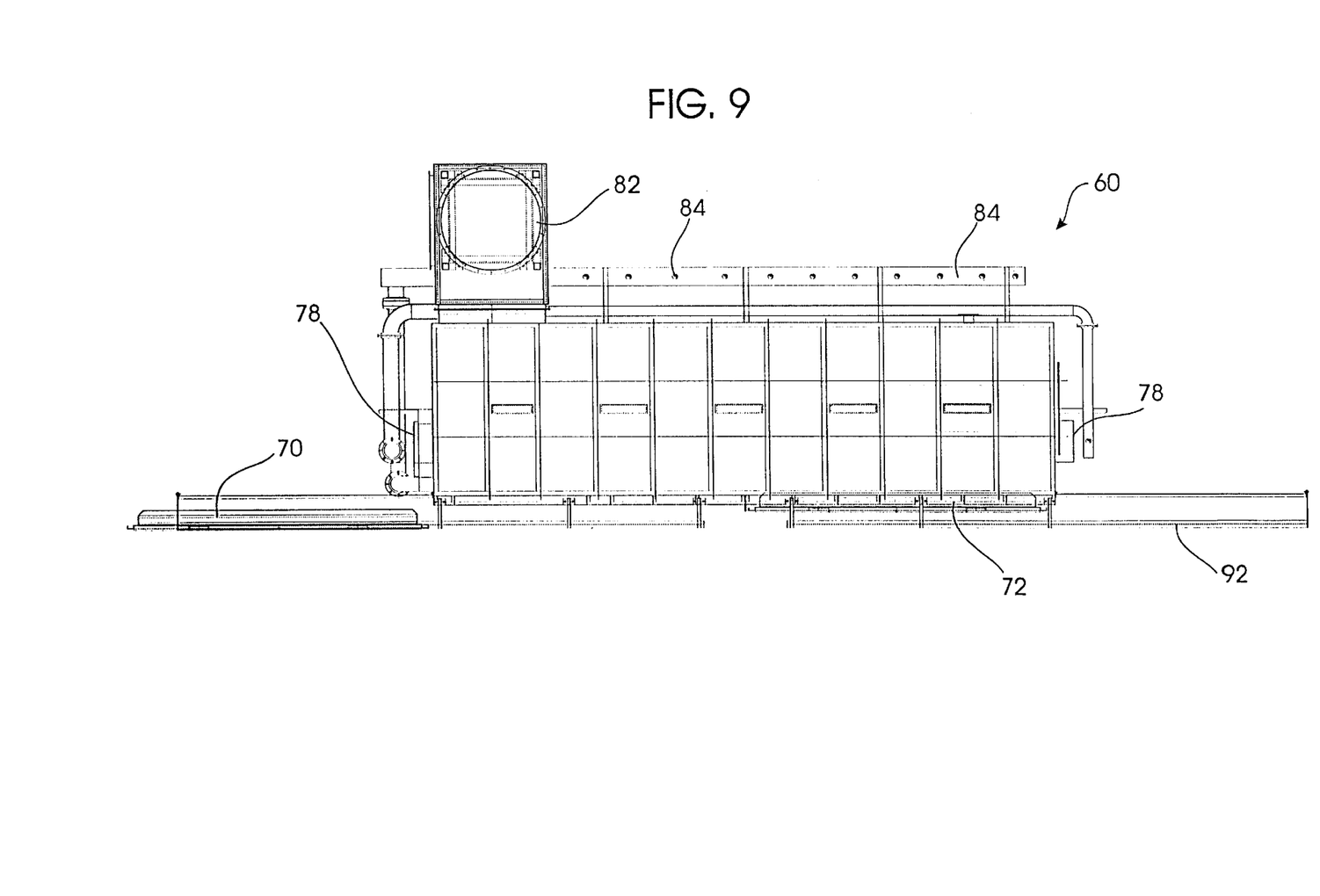
FIG. 9 illustrates a top view of the material recovery system shown in FIGS. 6, 7 and 8.

Finally, the temperature in the furnace is lowered through cool down air manifolds 84 so that the filters are controlled cooled. FIG. 9 illustrates a top view of the second embodiment 60 with the secondary chamber 80 and the top of the furnace 68 removed for ease of viewing.

This multi-stage sequence has been found to be effective in reducing the combustables in the compacted blocks to steel with trace amounts of carbon black. The trace amounts of carbon black are advantageous in the making of high carbon steel, wherein carbon is often added. The present process ensures that there will be little secondary emission or smoke from the stack.

Figure 10:
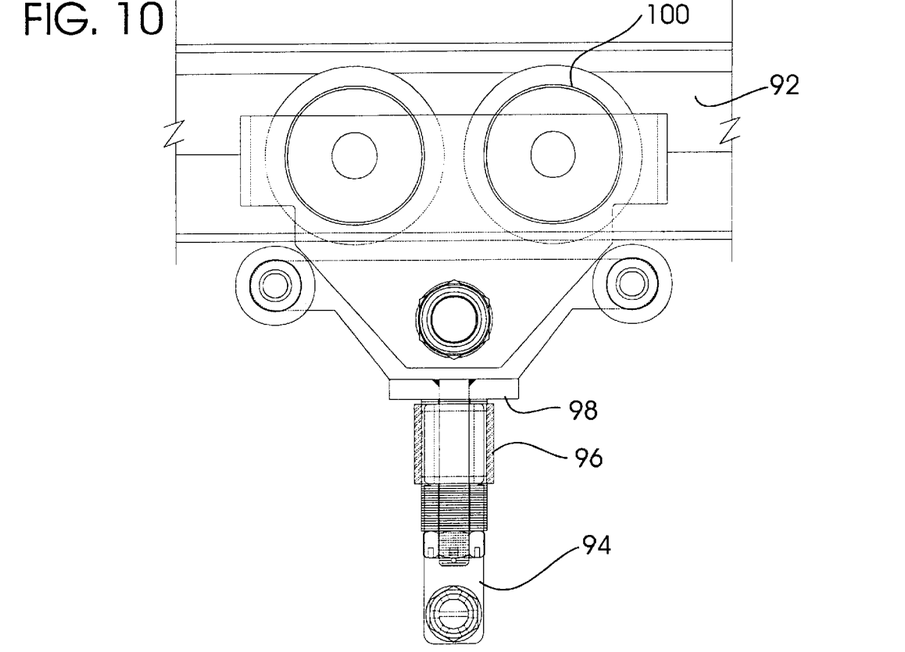
FIGS. 10 and 11 illustrate a track and roller assembly for doors on the material recovery system shown in FIGS. 6, 7, 8 and 9.
Figure 11:
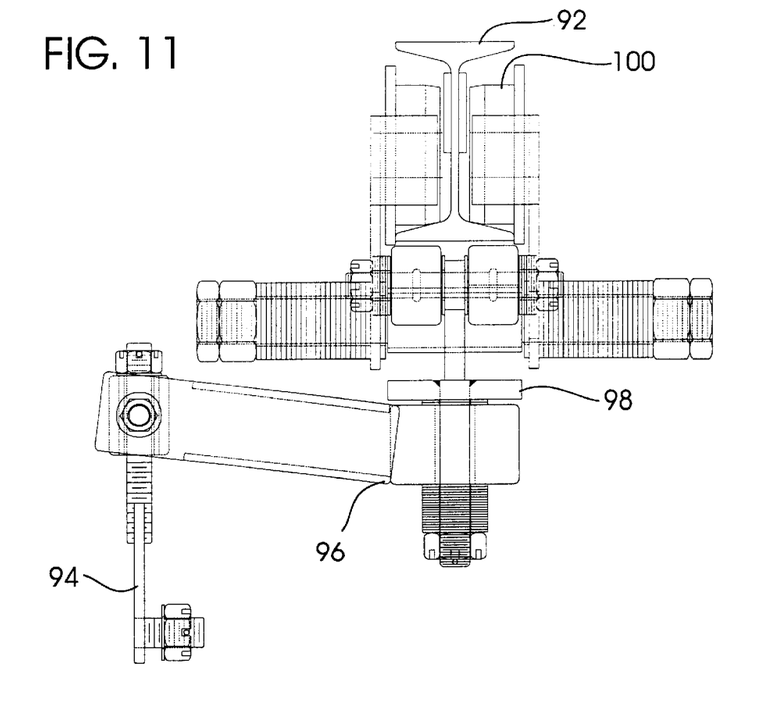

With reference to FIGS. 6 and 7, FIG. 9 illustrates the door 70 in the open position and the door 72 in the closed position. Each of the doors moves on a track 92. Extending from each door is a door hanger bar 94 as best seen in FIGS. 10 and 11. The door hanger bar 94 is connected to a door pivot bar 96 which can rotate about a trolley guide 98. The trolley guide 98 moves along the rail beam by a means of a series of rollers 100.

Figure 12:
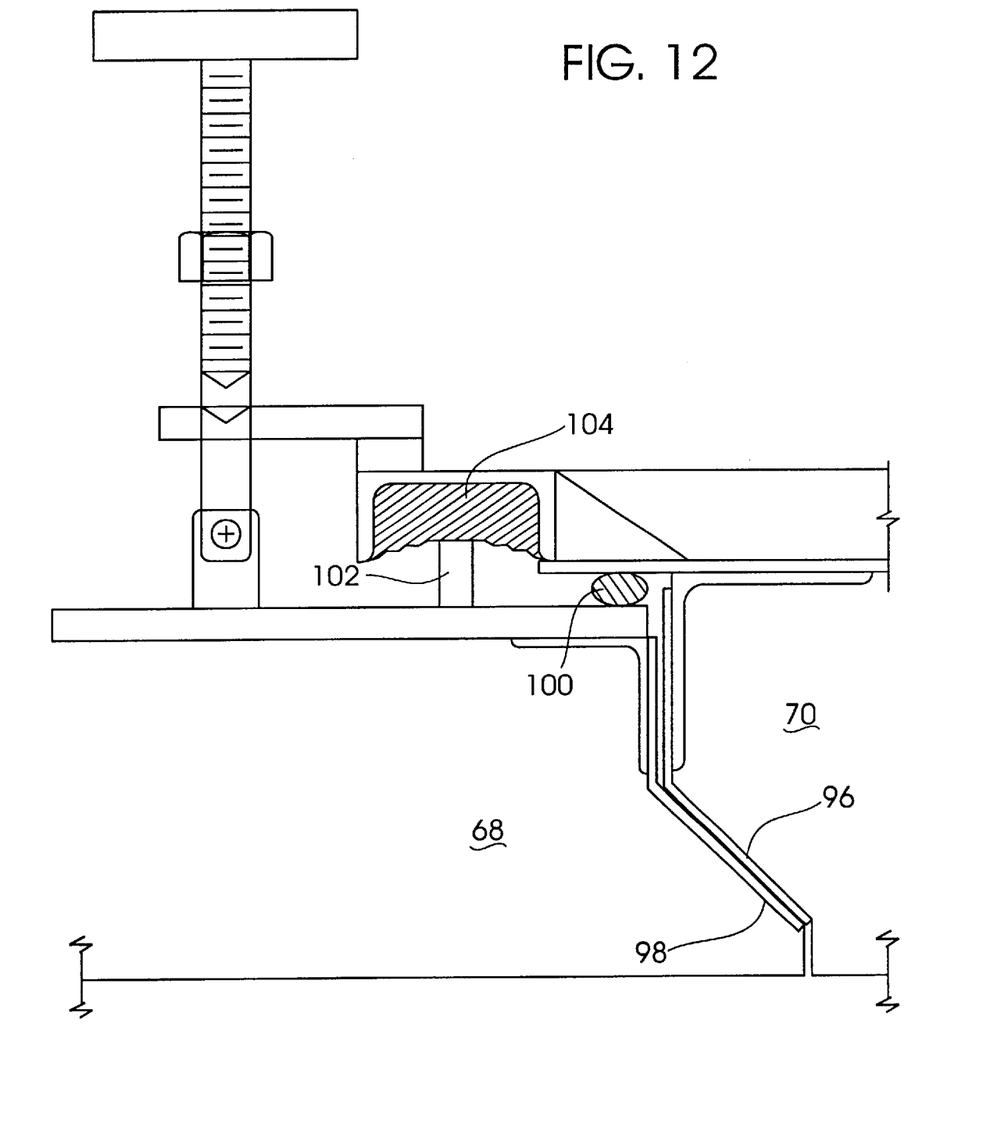
FIGS. 12 and 13 illustrate a multiple seal arrangement between the door and the furnace.
Figure 13:
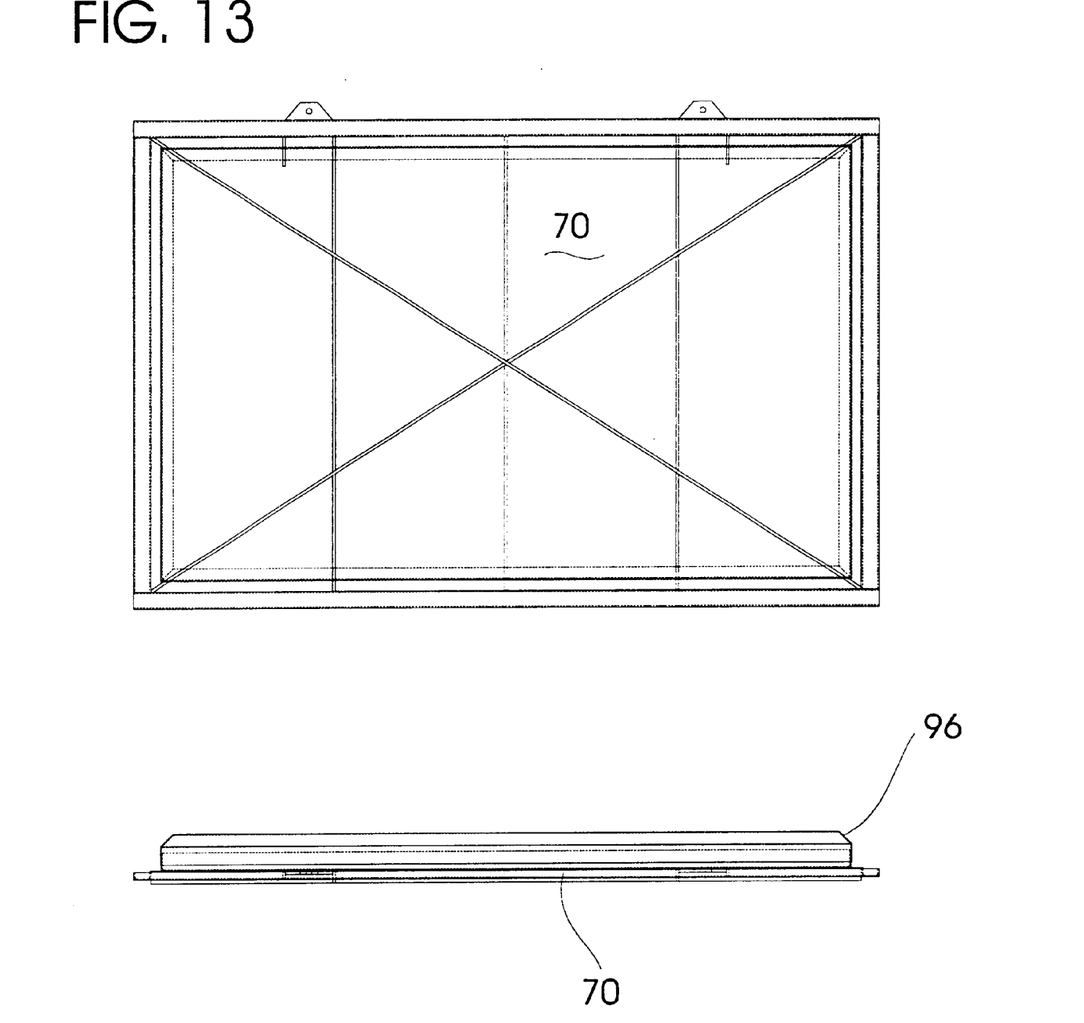

FIG. 12 shows either of the doors 70 (or 72) in the fully closed position. A triple seal arrangement is provided. The door, seen apart from the furnace in FIG. 13, has a chamfered, 45° angle along one edge 96 and seals with the face of the furnace 68 at the open side 98. Additionally, a high temperature tadpole 100 or other gasket provides a seal between the door 70 and the furnace face. Finally, an extending bar 102 extending from the face of the furnace presses and seals into a fiber material 104 in a pocket on the door 70. Accordingly, three separate seals insure that air will not enter or escape.

It will be understood that a similar triple seal arrangement may be employed on the initial, rail car embodiment previously described.

Whereas, the present invention has been described in relation to the drawings attached hereto, it should be understood that other and further modifications, apart from those shown or suggested herein, may be made within the spirit and scope of this invention.

What is claimed is:

1. A material recovery process, which comprises:

loading at least one basket or rack with a plurality of oil contaminated materials;

loading said at least one basket on a car on rails wherein said car is rolled into a sealable furnace;

heating said oil contaminated materials in said furnace to a first temperature range for a first given time period;

draining oil released from said oil contaminated materials from said furnace;

heating said oil contaminated materials to a second temperature range for a given second time period such that oil from said oil contaminated materials is further released; and heating said oil contaminated materials to a third temperature range for a given third time period such that said oil contaminated materials are reduced.

2. A material recovery process as set forth in claim 1 wherein said oil contaminated materials are used oil filters containing oil.

3. A material recovery process as set forth in claim 2 wherein said used oil filters are crushed prior to loading in said at least one basket.

4. A material recovery process as set forth in claim 1 wherein said car has a bottom with a plurality of slots and sloped surfaces leading to said slots.

5. A material recovery process as set forth in claim 1 further including sealing the furnace after loading said at least one basket therein and before said heating.

6. A material recovery process as set forth in claim 5 wherein said furnace is sealed by at least one door.

7. A material recovery process as set forth in claim 1 wherein said furnace includes a plurality of burners and wherein air is allowed into said furnace by controlling said burners.

8. A material recovery process as set forth in claim 1 wherein said first temperature range is between 250° and 600° F. and wherein said first time period is approximately two to three hours.

9. A material recovery process as set forth in claim 1 wherein said second temperature range is between 400° and 800° F. and wherein said second time period is approximately two to four hours.

10. A material recovery process as set forth in claim 1 wherein said third temperature range is between 600° and 1200° F. and wherein said third time period is approximately two to four hours.

11. A material recovery process as set forth in claim 1 wherein said oil is gasified during said heating to a second temperature range for a given second time period and said heating to a third temperature range for a given third time period in the furnace and directed to a secondary chamber in fluid communication with said furnace.

12. A material recovery process as set forth in claim 11 wherein said secondary chamber is initially heated to at least 1600° F.

13. A material recovery process as in claim 1 further including heating said oil contaminated materials to a forth temperature range of between 800° and 1400° F. for approximately four hours.

14. A material recovery process as set forth in claim 1 further including allowing said oil to flow from said furnace by gravity to a storage tank and pumping said oil from said furnace after said draining.

15. A material recovery process as forth in claim 1 wherein said oil drained from said filters is recovered for use as fuel to said furnace.

16. A material recovery process, which comprises:

loading at least one basket or rack with a plurality of oil contaminated materials;

loading said at least one basket or rack onto pallets and thereafter lifted into said furnace;

heating said oil contaminated materials in said furnace to a first temperature range for a first given time period;

draining oil released from said oil contaminated materials from said furnace;

heating said oil contaminated materials to a second temperature range for a given second time period such that oil from said oil contaminated materials is further released; and heating said oil contaminated materials to a third temperature range for a given third time period such that said oil contaminated materials are reduced.

17. A material recovery process as set forth in claim 16 wherein said oil contaminated materials are used oil filters containing oil.

18. A material recovery process as set forth in claim 17 wherein said used oil filters are crushed prior to loading in at least one basket.

19. A material recovery process, which comprises:

loading at least one basket or rack with a plurality of oil contaminated materials;

loading said at least one basket into a sealable furnace;

heating said oil contaminated materials in said furnace to a first temperature range for a first given time period;

draining oil released from said oil contaminated materials from said furnace;

heating said oil to a second temperature range for a given second time period; and heating said oil contaminated materials to a third temperature range for a given third time period, such that said oil contaminated materials are reduced, wherein said furnace includes a sloping floor for said draining of said oil.

* * * * *